United States Patent [19]

Reinecke

[11] 4,223,955
[45] Sep. 23, 1980

[54] LOAD-DEPENDENT BRAKING FORCE CONTROL DEVICE

[75] Inventor: Erich Reinecke, Beinhorn, Fed. Rep. of Germany

[73] Assignee: WABCO Westinghouse GmbH, Hanover, Fed. Rep. of Germany

[21] Appl. No.: 916,033

[22] Filed: Jun. 15, 1978

[51] Int. Cl.² ............................................. B60T 8/22
[52] U.S. Cl. ................................................ 303/22 R
[58] Field of Search .................... 303/6 R, 6 C, 22 A, 303/22 R

[56] References Cited

U.S. PATENT DOCUMENTS

| 3,155,435 | 11/1964 | Nicolay et al. ................ 303/22 R X |
| 3,405,978 | 10/1968 | Lepelletier ........................ 303/22 R |
| 4,090,740 | 5/1978 | Farr .................................. 303/22 R |
| 4,143,924 | 3/1979 | Coupland ..................... 303/22 R X |

FOREIGN PATENT DOCUMENTS 277518 3/1965 Australia ............................... 303/22 R

*Primary Examiner*—Duane A. Reger
*Attorney, Agent, or Firm*—R. S. Visk; R. W. McIntire, Jr.

[57] ABSTRACT

A vehicle load responsive brake control device for adjusting the braking force according to the varying load of the vehicle in each braking range; its purpose is also to ensure control of the braking action in such a manner that, independently of the existing vehicle load, the actuating force required is always approximately the same. Another purpose of the brake control device is to adjust the braking forces in accordance with the dynamic shifting of the axle loads.

10 Claims, 9 Drawing Figures

LOAD-DEPENDENT BRAKING FORCE CONTROL DEVICE

BACKGROUND OF THE INVENTION

It is known that the braking system of a vehicle is designed for the case of maximum load. If, in this case, it is assumed that the vehicle is in a braking range where the anti-locking device does not have to be activated, a pressure medium is applied to all brake cylinders in proportion to the opening of the brake valve. The applied pressure in this case is equal to the pump pressure. This causes the forces applied to the front and rear axles of the vehicle to be equal.

In the case of an unloaded vehicle, the following takes place: since the load of the vehicle acts, as a rule, on the rear axle, the braking force acting on the front axle is, in this case, proportionally greater than that acting on the rear axle. Since the brake system is designed primarily for a fully loaded vehicle, and not usually for an empty vehicle, this means in the case under discussion that, as a result of the lack of load on the rear axle, the rear wheels are locked first when the brake is applied and then the front wheels. One of the requirements of brake design is, however, that the front wheels should be locked first and subsequently the rear wheels.

In order to prevent the rear wheels in an empty or partially loaded vehicle from being locked before the front wheels, it is therefore necessary at a certain point to interrupt or restrict the flow of pressure medium to the brake cylinders of the rear wheels. Such control devices are known. These control devices cause the force acting on the front axle of the vehicle to increase in proportion to the applied pressure, while the force acting on the rear axle remains constant or increases at a proportionally slower rate after passing a point corresponding to the load, hereinafter called load-changing points, independently of the applied pressure.

The known braking force control devices are preadjusted by means of an adjusting lever. A tension spring which is acted on by a system of levers adjustable as a function of the load, is connected to the adjusting lever.

The system or device is designed in such a way that a linear relationship exists between the braking pressures required for corresponding to load variations, and the force acting on the adjusting lever or the deflection of the tension spring, which may be expressed by the equation $p = c \times s$ wherein p is braking pressure, c is vehicle load, and s is spring deflection. Vehicles are frequently equipped, for example with leaf springs. Due to the usually progressive deflection characteristic of these leaf springs, the amount of deflection of the spring and the average rate thereof is greater for vehicle loads within a given range of low loads, than the smaller amount and rate of deflection of the spring in a given range of higher loads. This progressive deflection character of the leaf spring system of the vehicle has an effect on the above-mentioned linear relation of pressure and spring deflection.

The law requires a certain so-called braking range, f, so that the function $p = f(s)$ must be chosen in accordance with this range. As a rule, this range requires a progressive character, so that there is a danger that the function $p = f(s)$ falls outside this range for certain load conditions unless additional steps are taken. Known solutions are special lever designs, for instance designs which cause the displacement of the lever to be transferred progressively to the tension spring.

The known load responsive control device systems exhibit as a whole the following disadvantages. Due to the fact that the movement of the lever is used to more or less pretension the control spring, relatively large forces act on the lever system and this fact requires that the lever system must be built to be correspondingly stable, heavy and voluminous. These large forces must be transmitted, which increases the cost of the structure. These known control devices are therefore force-operated.

The danger consists of the fact that fatigue phenomena will occur in the pretensioned tension spring. During operation of the vehicle, either excessive or insufficient movements will occur in the lever-system transmitting the forces, for example as the result of potholes. This creates the danger of overloading, which may damage the spring. In order to prevent such overloading, a more expensive design is required.

An important disadvantage of the known control devices is that forces act on the entire load-dependent adjusting system even when the brakes are in a release state, for example, because of axle oscillations; this creates the danger of premature wear.

Even if the above-mentioned danger of overloading caused by excessive movements can be largely eliminated by providing suitable cam surfaces in the adjusting device, the disadvantage still persists that oscillations of the axles are transmitted and that forces are still applied even in the brake-release condition.

SUMMARY OF THE INVENTION

For this reason, it is the purpose of the present invention to provide an improved load-responsive brake control device of the above-named type in such a manner that the disadvantages of the known control devices are eliminated and that, in particular, axle oscillations are not transmitted to the spring and that no braking force is applied if the brakes are in a release state. Another purpose is to eliminate the danger of failure of the load-responsive control system due to the spring because of overloading and oscillations and to ensure, by simple control means, that the function $p = f(s)$ falls, within the entire permitted load range, into the above-named range and develop, in addition, a design which permits complying by simple means with the narrow tolerances set by statutory regulations.

The invention proposes a separation of cam and piston of the control valve and a connection between the cam and a supply valve member. This isolates the valve piston from the axle as far as the transmission of forces is concerned, so that overloads which are caused, for example, by oscillations of the axle can no longer be transmitted to the control spring itself. This design also eliminates the application of force when the brakes are in a released state. The invention therefore permits elimination of the disadvantageous force or spring control systems of the known control devices; this control by force has been replaced by a load-dependent displacement of the valve part; this is accomplished by having the cam which is moved in response to load variations, so to speak, directly position the supply valve member of the control valve in relation to the valve piston. It is no longer necessary to change the pretensioning of the spring. The control system can be manufactured at considerably less cost, because practically no forces have to be transmitted. Wear is substantially reduced and safety is improved.

Moreover, in accordance with the invention, the piston, in contrast to known designs, is no longer biased with a constant biasing force by means of a spring, but the biasing force acting thereon changes with movement of the spring or the piston, as for example, either continuously or in steps. This design ensures that for certain partial load conditions the function p=f(s) changes in such a way that said function p=f(s) adapts itself to the limits of the above-mentioned tolerance range.

A further advantage of the invention is that the supply valve is open at any load condition of the vehicle if the brakes of the vehicles are in a released state, i.e., when no pressure is applied to the control device. This arrangement defines an unequivocal idle position of the valve and also ensures that the adjustment of the valve as a function of the load takes place without play and without the plunger striking a blow on the valve body of the control device.

To ensure that the load-responsive pressure changes continuously with the deflection of the spring, in order to remain within the above-mentioned P/s range, the spring is designed as a compression spring with continuously changing pitch. The limits of the tolerance range can be progressive or degressive, with the turns of the spring making solid contact with each other in sequential order. If adaptation to the tolerance range can be obtained by changing the spring characteristic in steps, the spring can be designed with several sections with different pitches.

In the control device according to the invention the control piston is therefore biased by a spring, with suitably chosen spring characteristics independently of the load-responsive adjusting device. The desired characteristic p=f(s) of the control device which ensures compatibility with specified tolerance range can, according to a further feature of the invention, be attained either by a suitable choice of the biasing spring for the piston, or by means of a suitable cam surface shape, or by a combination of both.

It has been found in practice that due to the narrow tolerance range (Cf. FIGS. 5 and 7, T) in many instances it is difficult to remain within the range by using a characteristic consisting of two straight parts. In order to eliminate this difficulty, spring systems are provided in accordance with a further development of the invention, whose characteristics have three parts, including a center part for better adaptation to the tolerance range in its critical part. The center part may be straight or curved.

In order to keep within the tolerances, a particularly advantageous design according to the invention provides independent setting of the biasing effect of the springs and of the load-changing points where the springs become effective.

DESCRIPTION AND OPERATION

Figure 1:
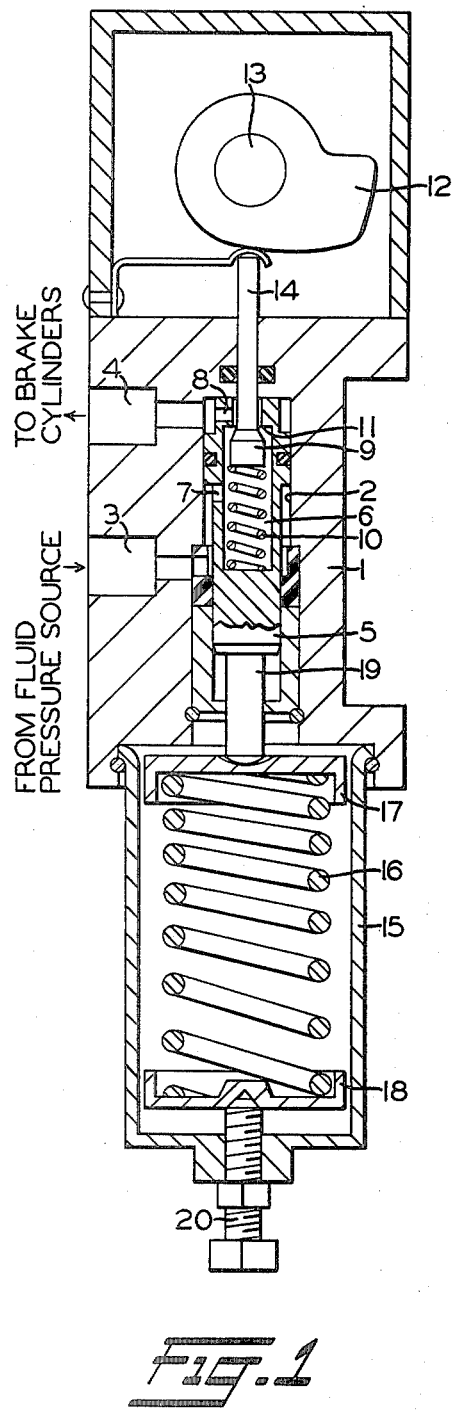
FIG. 1 shows an elevational sectional view of a load-responsive brake force control device embodying the invention.

We are now referring to FIG. 1. A housing 1 has a coaxial bore 2 formed therein and communicating with an inlet 3 for the applied pressure and an outlet 4 formed in said housing. A stepped hollow piston 5, a portion of which is of smaller diameter than bore 2 to provide an annular space therebetween, is axially guided in the bore and has a hollow blind recess 6 formed therein, which is in communication with inlet 3 and outlet 4 through openings 7, 8, respectively, radially disposed in the piston wall. A supply valve member 9 axially movably disposed in recess 6 is biased by a spring 10 in the direction of a valve seat 11 formed internally on piston 5. Spring 10 bears against the closed end of recess 6. Piston 5 is positively connected with a cam 12 on a shaft 13 by means of a stem 14 guided in housing 1. Cam 12 is a rotatable disc-type cam having a radially variable cam surface forming the outer periphery thereof disposed perpendicularly to the axis of shaft 13 for making separable contact with the end of stem 14. The position of cam 12 is determined as a function of vehicle load by means of a lever (not shown) which is attached to shaft 13 for rotating said shaft and setting the angular position of said cam according to the load acting on a sprung portion (not shown) of the vehicle. Stem 14 makes separable contact with cam 12 rather than an attached connection, so as not to be affected by axle oscillations which might cause undesirable false braking action. The arrangement is designed in such a manner that valve member 9 is unseated or in an open position relative to seat 11 even when the vehicle is empty.

At the lower end (as viewed in FIG. 1 of the drawing) of housing 1 there is provided a spring housing 15 containing a spring 16, which bears against spring disks 17 and 18 and biases the piston against the applied pressure by means of a plunger 19 guided in the housing. The basic biasing effect of spring 16 is adjustable by means of an adjusting screw 20. Spring 16 is a spiral spring with continuously changing pitch, which causes a number of spring turns to make solid contact prematurely and giving rise to a progressive spring characteristic.

The load-dependent braking force control device works as follows: When the brake is in a release situation and the vehicle is empty, the several parts of the control device are in the respective positions shown, with valve member 9 in its open unseated position relative to valve seat 11. When the brake is operated to an applied situation, pressure is applied through inlet 3 to act on piston 5 and moves it downwardly, as viewed in the drawing, against the biasing force of spring 16. The pressure applied through inlet 3 is transmitted through opening 7 and recess 6 of piston 5, past unseated valve member 9, and through opening 8 and outlet 4 to the brake cylinders (not shown). After the pressure has reached a predetermined value, which in the present case is comparatively low because the load is zero, valve seat 11 will be brought into contact with valve member 9 because piston 5 moves downwardly to cut off further transmission of pressure to the brake cylinders.

If the vehicle is partially or fully loaded, cam 18 is rotated by shaft 13 to such a position as to move piston 5 to a lower position than that shown in FIG. 1, so that a higher pressure is required, in accordance with that load, in order to push piston 5 downwardly against the biasing force of spring 16 until valve seat 11 formed on the piston makes contact with valve member 9 to stop further transmission of pressure to the brake cylinders. If the vehicle is fully loaded, valve member 9 is moved by cam 12 and stem 14 far enough into recess 6 of piston 5, that full applied pressure is transmitted through opening 8 to the brake cylinders.

Due to the varying pitch of spring 16, the brake pressure is no longer a linear function of the load, but a progressive one as will be explained in more detail in connection with FIG. 3.

Figure 2:
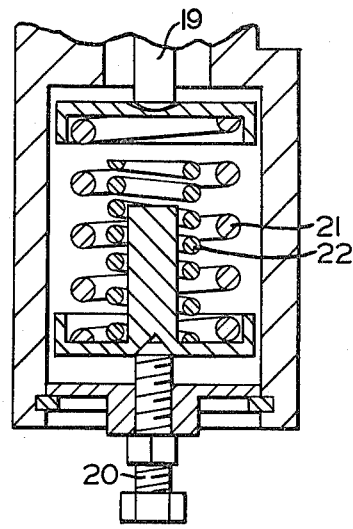
FIG. 2 shows a sectional view of a modification of a portion of the device shown in FIG. 1 including a special pretension spring arrangement for a piston of the control device.

FIG. 2 shows a combination of two springs 21 and 22 for generating the spring force acting against piston 5. Spring 21 is a helical spring of constant pitch and consequently uniform characteristic for the entire spring deflection, while spring 22 is a spiral spring with increasing pitch which only becomes effective after spring 21 has been partly compressed, as may be seen in FIG. 2.

As hereinbefore mentioned in the introduction to the description, certain laws specify a tolerance range within which the function $p=f(s)$ of a load-dependent brake force control device must lie. In FIG. 3, such a range, with progressive characteristic, is shown graphically by the shaded area. Control devices known up to now, with linear relation between p and spring deflection s, have a linear characteristic which corresponds in principle to a straight line x, as shown in the graph; in this case the danger exists that for larger loads the straight line x falls outside the tolerance range or shaded area, which means that at these higher loads the available brake pressure is not sufficient to meet statutory requirements; the stopping distance then becomes too long.

Figure 3:
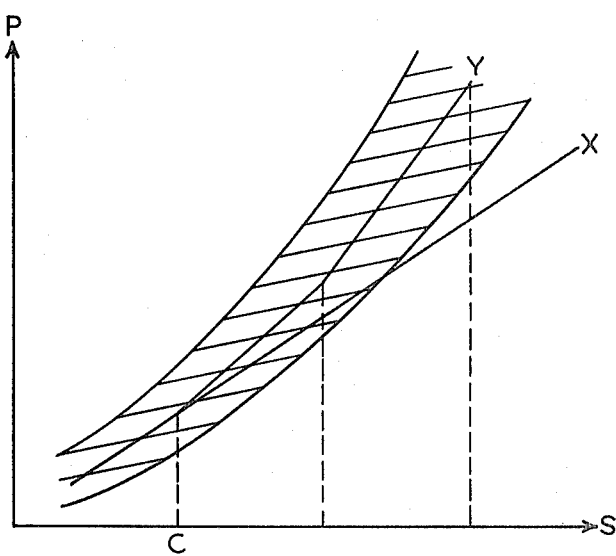
FIG. 3 is a graphic representation of the relationship between brake pressure for different load conditions as a function of the deflection of a pretensioning spring in presently known control devices and for the control device according to the invention.

If the spring is chosen in accordance with the invention, we obtain a relationship between p and s which corresponds to a curve y, as shown in FIG. 3, which falls within the prescribed tolerance range and thus complies with the statutory requirements. A relationship between p and s falling within the specified tolerance range can also be obtained by means of suitably chosen cam shapes or a combination of a suitable cam shape and a suitable spring characteristic of spring 16.

The pretensioning of valve member 9 can be obtained by means of a spring, such as spring 10 as shown in FIG. 1, but also by means of the applied pressure.

Figure 4:
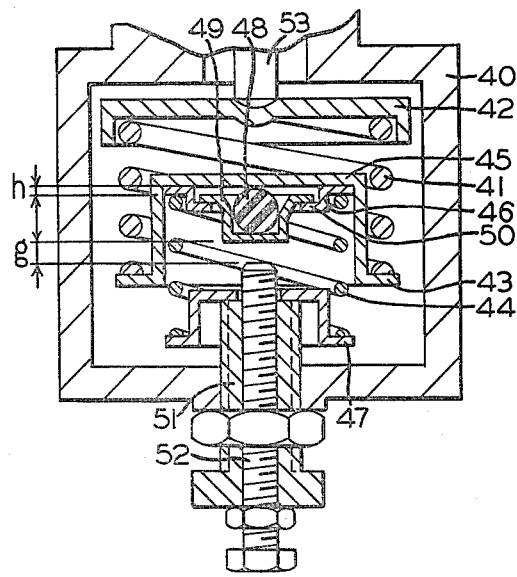
FIG. 4 shows a further embodiment of a spring arrangement for the piston of the control device.

With reference now being made to FIG. 4, a pretensioned spring system is located in a housing 40. A first spring 41 bears against a spring disk 42 and a spring cup 43, as shown. Underneath the spring cup 43 there is a second spring 44, one end of which bears against a flange 45 of a Z-shaped holding ring 46 and spring cup 43, the other end of which bears against a spring disk 47. Underneath the spring cup 43 there is an additional spring or resilient element 48 in the shape of an elastic ball of rubber, for example, and disposed in a pocket centrally formed in a spring disk 49 which is held laterally by another flange 50 of holding ring 46. Springs 41 and 44 are placed in series, while spring element 48 and spring 44 are placed in parallel. Spring disk 47 rests on a hollow adjusting screw 51 which can be used to adjust the compressions of springs 41 and 44. The bore of hollow screw 51 comprises a thread in which an additional adjusting screw 52 for adjusting the play, indicated g in the drawing, of spring element 48 is adjustably guided. A plunger 53 exerts a force on spring disk 46 which is a function of the pressure, similarly to plunger 19, as discussed above and shown in FIG. 1.

The mechanism shown in FIG. 4 functions as follows (we are simultaneously referring to FIG. 5 where the load-changing points relative to P are plotted as a function of the spring deflections s of the mechanism, represented graphically by curve 2).

The movement takes place in three phases, designated I, II, and III, respectively.

In phase I of movement, if plunger 53 moves downwardly, spring 41 is also moved downwardly through spring disk 42, and spring 44 is simultaneously compressed through spring cup 43 until spring disk 49 makes contact with adjusting screw 52. This first phase of movement is represented graphically by part $z_1$ of characteristic curve z in FIG. 5. By changing the compression of springs 41 and 44, with the aid of adjusting screw 51, the direction of the curve can be changed for adjusting and bringing the operation of the control device into better conformity with the tolerance range T, as indicated by the broken lines $z_1'$ and $z_1''$. The first load-changing point $P_1$ is reached at the end of phase I of movement, when spring disk 49 makes contact with adjusting screw 52.

In phase II of movement, if plunger 53 moves further downwardly, the effect of spring element 48 is added in parallel or accumulatively to spring 44, which causes an increase of the total spring constant and consequently a steeper rise of the characteristic curve. As the spring element has a progressive characteristic, the characteristic curve will be positively curved in its part $z_2$, until phase II of movement is completed. This phase ends when spring element 48 has been compressed by the distance h and spring disk 49 makes contact with spring cup 43; when this happens, the second load-changing point $P_2$ on the characteristic curve z is reached. Spring element 48 and simultaneously spring 44 are now made ineffective.

In phase III of movement, if plunger 53 moves further downwardly, only the first spring 41 remains effective, with a correspondingly higher spring constant, so that we get the third, steeper, part $z_3$ of the characteristic curve z. By changing the gap g with the aid of adjusting screw 52, the position of load-changing point $P_2$ can be changed in order to obtain better conformity of the characteristic curve z with the tolerance range, as indicated by the broken lines $z_3'$ and $z_3''$.

Figure 6:
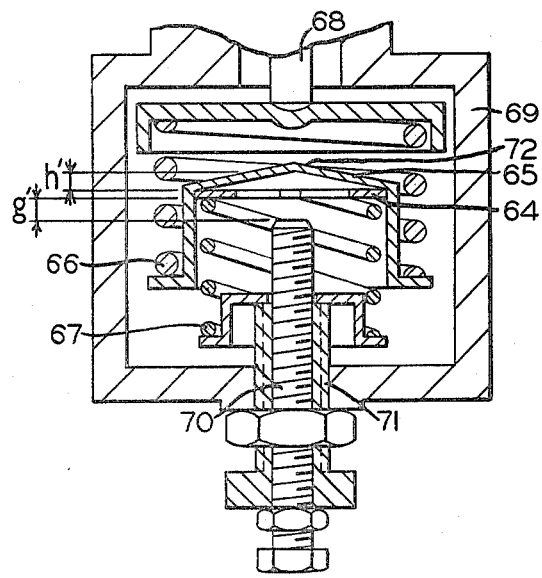
FIG. 6 shows an additional embodiment of a spring arrangement.
Figure 7:
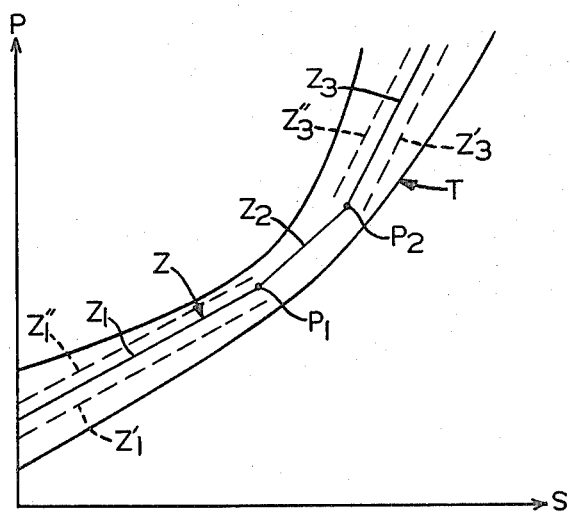
FIG. 7 is a graphic representation of the characteristics obtainable with the spring arrangement shown in FIG. 6.

FIG. 6 shows a further embodiment of the spring arrangement according to the invention, which gives the characteristic curves shown in FIG. 7. This design differs from the design shown in FIG. 4 basically by the fact that a spring-washer 64 is substituted for spring element 48. This substitution permits elimination of holding ring 46 and spring disk 49 (FIG. 4). Another difference consists of the change in the shape of a spring cup 65. The spring-washer 64 bears on the outer edge of spring cup 65. In this design, too, two springs 66 and 67 are provided, just as in the design of FIG. 4; they are also placed in series, while the spring-washer 64 and the second spring 67 are placed in parallel. A plunger 68 acts on spring-washer 69, just as in the design of FIG. 4.

The spring mechanism shown in FIG. 6 functions as follows with simultaneous reference to FIG. 7 in which the load-changing points P are plotted as a function of the spring deflections in this mechanism represented by curve z.

In this design, too, there are three phases of movement, I, II, and III, respectively.

In phase I of movements, spring 66 moves downwardly and spring 67 is compressed simultaneously until spring-washer 64 makes contact with an adjusting screw 70, which corresponds to adjusting screw 52 in FIG. 4. This movement generates the first part $z_1$ of characteristic curve z (FIG. 7). By changing the compression of springs 66 and 67 with the aid of an adjusting screw 71 (this adjusting screw corresponds to adjusting screw 51 in FIG. 4), the direction of the curve can be changed, analogous to the procedure described in connection with FIGS. 4 and 5. Load-changing point $P_1$ is reached at the completion of phase I of movement.

In phase II of movement, spring-washer 64 is pushed upwardly in the center until this part of the spring-washer makes contact with the roof-shaped part 72 of spring cup 65 after its deformation reaches the value $h'$. This phase of movement generates the straight center part $z_2$ of the characteristic curve z. The second load-changing point $P_2$ is reached at the completion of this phase of movement and spring-washer 64 and, simultaneously, spring 67 are made ineffective.

In phase III of movement, after the spring-washer 64 and spring 67 have been made ineffective, only spring 66 remains effective in this phase, analogous to the design of FIG. 4, and the third, steeper, part $z_3$ of characteristic curve z is generated. This part, too, can be changed by adjustment of the distance $g'$ with the aid of adjusting screw 70, as was described in connection with FIGS. 4 and 5.

The spring-washer can be made with a slit, as shown, or be designed in such a way that the desired characteristic, in particular a progressive characteristic, is obtained, analogous to the spring element of FIG. 4.

Figure 8:
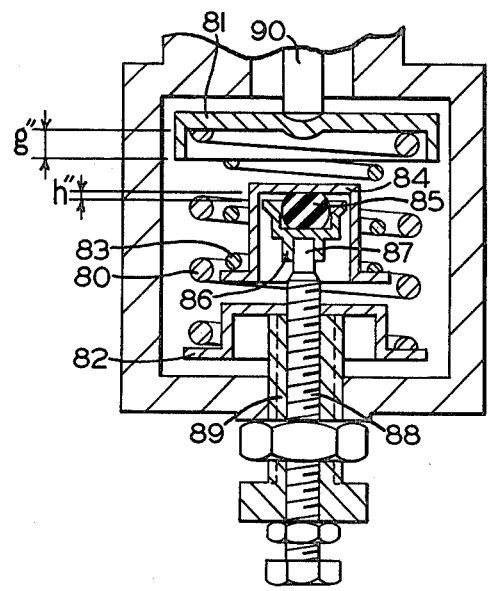
FIG. 8 shows an additional embodiment of the spring arrangement for the piston of the control device.

FIG. 8, to which reference is made now, shows another embodiment of the spring mechanism according to the invention. A first spring 80, bearing on two spring disks 81 and 82, and a second spring 83 are arranged in parallel; spring 83 is supported only on one end, i.e. by a spring cup 84. A spring element 85 is placed in series with said spring 83, with element 85 seated in a spring cup 86 located on an extension 87 of an adjusting screw 88 which is used to adjust the distance $g''$. A second adjusting screw 89 is used for changing the compression of spring 80. A plunger 90 acts on spring disk 81.

Figure 5:
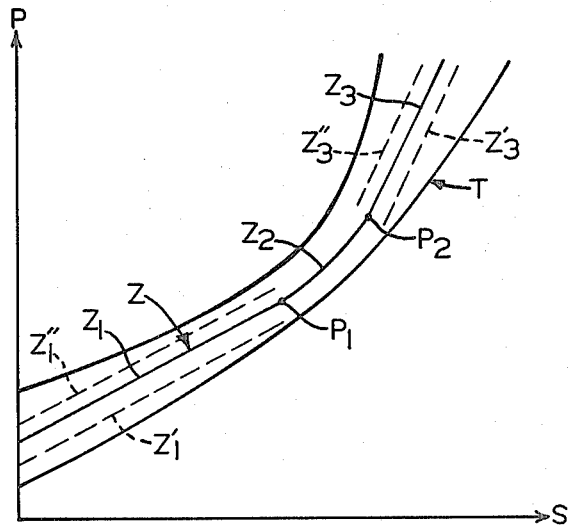
FIG. 5 is a graphic representation of the characteristics obtainable with the spring arrangement shown in FIG. 4.

The action of the design of FIG. 8 will now be described, (with reference to FIG. 5 showing a characteristic curve which is essentially identical with that generated by the spring mechanism of FIG. 8).

With the spring mechanism of FIG. 8, we also obtain three phases of movement, I, II, and III.

In phase I of movement, initially only spring 80 is compressed and part $z_1$ of characteristic curve z is generated (FIG. 5). As the spring moves through the distance $g''$, load-changing point $P_1$ on the characteristic curve is reached.

In phase II of movement, after spring 80 has moved through the distance $g''$, spring disk 81 makes contact with spring 83. Now the spring action is exerted only by the series arrangement consisting of spring 83 and spring element 85, which may be an elastic or rubber ball, as in FIG. 4, or an elastic O-ring. The mechanism generates the curved center part $z_2$ of the characteristic curve until the spring element has moved through the distance $h''$. When this movement is completed, the second load-changing point $P_2$ is reached and spring disk 81 makes contact with spring cup 84.

In phase III of movement, spring element 85 is ineffective and the spring action is exclusively exerted by the parallel arrangement of the two springs 80 and 83, which together determine the shape of the steep part $z_3$ of the characteristic curve (Cf. FIG. 5). This parallel arrangement results in a higher overall spring constant, which in turn makes it possible to obtain a steeper rise of the third part $z_3$ of the characteristics curve, for instance if adaptation to vary steep tolerance ranges is necessary.

Figure 9:
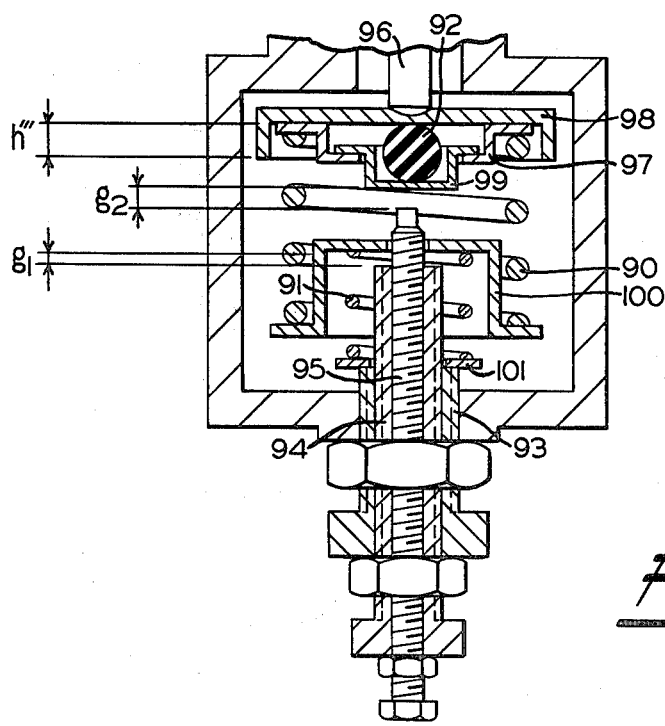
FIG. 9 shows a still further embodiment of the spring arrangement according to the invention for the piston of the control device.

Reference is now made to FIG. 9 which shows an additional embodiment of the spring mechanism according to the invention, which, just as the mechanism of FIGS. 4, 6 and 8, comprises first and second springs 90 and 91 as well as a spring element 92. In the spring mechanism of FIG. 9, however, the compressions of the two springs 90 and 91 and the points where the second spring 91 and spring element 92 become effective can be adjusted separately and independently. The compression of the first and the second springs 90 and 91 is adjusted together with the aid of an external hollow screw 93. The point where the second spring 91 becomes effective can be adjusted by means of a central hollow screw 94 which adjusts the length of stroke $g_1$, and the point where spring element 92 becomes effective can be adjusted by changing stroke $g_2$ by means of a screw 95 coaxially adjustably disposed in the central hollow screw 93. The first spring 90 bears on the opposite side of a plunger 96 also bearing on a holding ring 97 through contact with a spring disk 98, with said holding ring holding a spring cup 99, in which spring element 92, for example a rubber ball, is located. The other end of spring 90 bears on the outer flange of a spring cup 100, which in turn supports one end of spring 91, which with its other end rests on a spring disk 101, which is positively acted upon by adjusting screw 93.

The spring mechanism of FIG. 9 functions essentially as follows, with the individual parts of said mechanism being designed in such a way that three phases of movement are obtained which generate a three-part characteristic curve.

In phase I of movement, spring 272 initially is the only one to move downwardly until spring cup 100 makes contact with screw 94 and spring 91 becomes ineffective. This generates the first part of the characteristic curve.

In phase II of movement, spring 90 becomes effective until spring cup 99 makes contact with screw 101; this generates the second part of the characteristic curve.

In phase III of movement, spring element 92 becomes effective in parallel with spring 90; this generates the third part of the characteristic curve.

Depending on the ratios between the spring constants and on the values obtained with the aid of the three adjusting screws for the points where the individual springs become effective, for the displacements required for them to become effective or for the spring deflections, it is possible to obtain a great variety of characteristic curves in order to obtain the best fit with the tolerance range established by the statutory regulations.

Having now described the invention, what I claim as new and desire to secure by Letters Patent, is:

1. A vehicle load-responsive braking force control device comprising:
   (a) a supply valve member for controlling flow of brake-applying fluid pressure between an inlet port and an outlet port;
   (b) a valve seat member having formed thereon a valve seat normally occupying an open position at a spaced-apart distance relative to said valve member for opening communication between said inlet and outlet ports, and being operable to a closed position relative to said valve member for closing said communication;
   (c) a radially variable disc-type cam member rotatably and angularly positionable according to vehicle load;
   (d) a stem operably interposed between the cam member and the valve member with one end secured to the valve member and the other end making separable contact with the cam member,
   (e) said cam member and said stem cooperating for positioning said valve member at said spaced-apart distance in accordance with the angular position of the cam determined by vehicle load; and
   (f) spring means characterized by a progressive compression rating for biasing said valve seat member toward said open position, said valve seat member being subjectable to said fluid pressure for exerting a force thereon in opposition to said spring means and effective for operating said valve seat member to its said closed position when the force of said fluid pressure exceeds that of the spring means.

2. A vehicle load-responsive braking force control device, as set forth in claim 1, wherein said spring means is characterized by a compression rating variable according to the deflection thereof.

3. A vehicle load-responsive braking force control device, as set forth in claim 1, wherein said valve seat member, in the absence of pressure at the inlet port, occupies its said open position for any load condition.

4. A vehicle load-responsive braking force control device, as set forth in claim 1, wherein said valve seat member comprises a hollow piston closed at one end and having a valve seat formed thereon at an open end in facing relation to said valve member.

5. A vehicle load-responsive braking force control device, as set forth in claim 1, wherein said spring means comprises at least a pair of springs arranged in serial relation and at least one of which has a compression rating variable according to the deflection of the spring.

6. A vehicle load-responsive braking force control device, as set forth in claim 1, wherein said spring means comprises a plurality of spring members of different compression ratings disposed in serial relation and rendered biasingly effective in sequential order in response to and in accordance with the opposing force of said fluid pressure acting thereon through said valve seat member.

7. A vehicle load-responsive braking force control device, as set forth in claim 6, wherein one of said spring members comprises a spherically shaped, elastomeric spring interposed between a pair of said spring members and being rendered biasingly effective upon attainment of solid compression by said pair of said spring members.

8. A vehicle load-responsive braking force control device, as set forth in claim 6, wherein one of said spring members comprises a spring washer interposed between a pair of said spring members and being rendered biasingly effective upon attainment of solid compression by said pair of said spring members.

9. A vehicle load-responsive braking force control device, as set forth in claim 1, wherein the initial biasing effect of said spring means is adjustable.

10. A vehicle load-responsive braking force control device, as set forth in claim 6, wherein the respective biasing effects of springs comprising said plurality are severally adjustable.

* * * * *